United States Patent Office 3,576,933
Patented Apr. 27, 1971

3,576,933
CROSS-LINKING PROCESS
Robert Frederick Bates and John Scanlan, Runcorn, England, assignors to Imperial Chemical Industries Limited, London, England
No Drawing. Filed May 2, 1969, Ser. No. 821,450
Claims priority, application Great Britain, May 15, 1968, 23,171/68
Int. Cl. B29c 25/00
U.S. Cl. 264—94                                  12 Claims

ABSTRACT OF THE DISCLOSURE

A process for the preparation of a shaped article of a cross-linked polymeric material by subjecting a shaped article of a crystalline polymer, particularly a crystalline polyolefin, containing a thermally activatable cross-linking agent particularly a free-radical generator, to a pressure sufficient to cause a rise of at least 10° C. in the crystalline melting point of the polymer and heating the shaped article while subjected to the pressure to a temperature which is below the crystalline melting point of the polymer at the said pressure and at which cross-linking will occur.

---

This invention relates to an improved method of cross-linking crystalline polymeric materials.

The cross-linking of polymeric materials by mixing them with thermally activatable cross-linking agents, e.g. free radical generators, and heating the compositions, usually in shaped form, to activate the cross-inking agent is well-known. In the case of crystalline polymers, e.g. polyethylene, however, the compositions have generally been heated above the crystalline melting point of the polymer to introduce the necessary cross-linking. As a result, some or all of the crystallinity has been destroyed and the product has suffered consequent reductions in, for example, creep resistance at elevated temperatures, heat distortion tempertaure and crystalline melting point. A marked drop in modulus may also be observed at temperatures below the crystalline melting point of the polymer and this is undesirable where the products are intended for use in hot environments, e.g. as hot water pipe.

Cross-linking of such materials may also be effected below the crystalline melting point of the polymer. For example, a cross-linking agent which is readily thermally activated at temperatures substantially below the melting point of the polymer may be absorbed into a shaped polymer article by immersing the article in a solution of the cross-linking agent in a swelling agent for the polymer and thereafter activated by heat to cross-link the polymer. However, the technique is generally suitable only for articles having a thin cross-section, e.g. films and fibres, and may require extended immersion times to ensure that an adequate amount of cross-linking agent is absorbed. Moreover, the shaped article may become deformed as a result of the immersion.

In an alternative method, cross-linking below the crystalline melting point may be effected by irradiation. However, this procedure may involve long periods of irradiation, especially with low energy sources, and with certain types of radiation e.g. high energy electrons it is suitable only for the cross-linking of shaped articles having a thin cross-section, e.g. films and fibres.

We have now found a method of cross-linking shaped articles of crystalline polymers which allows the cross-linking to be effected below the crystalline melting point of the polymer and yet which reduces or avoids some or all of the shortcomings associated with the above methods. The method also allows the use of cross-linking agents which are substantially inactive at temperatures near the crystalline melting point of the polymer and yet achieves cross-linking in relatively short times. It also provides increased flexibility in the choice of reaction conditions.

According to the present invention, the method comprises subjecting a shaped article of a crystalline polymer containing a thermally activatable cross-linking agent to a pressure sufficient to cause a rise of at least 10° C. in the crystalline melting point (Tm) of said polymer, and heating said shaped article while subjected to said pressure to a temperature which is below the crystalline melting point of said polymer at said pressure and at which cross-linking will occur.

Examples of polymeric materials to which this invention may be applied include crystalline polyamides, e.g. nylon-66, and crystalline polyesters, e.g. poly(ethylene terephthalate). It is particularly applicable, however, to crystalline polyolefins, e.g. crystalline ethylene and propylene polymers prepared using an anionic co-ordination (or Ziegler) catalyst system, crystalline ethylene polymers obtained by a peroxide activated polymerisation, and crystalline ethylene polymers prepared using a supported metal oxide catalyst system. It is to be understood that the crystalline polymeric materials may also include copolymers which are crystalline.

For use with crystalline polyolefins, the cross-linking agent is most suitably of the free radical generator type. For use with polyamides on the other hand, it may be, for example, a polyfunctional compound which is capable of reacting with amino hydrogen atoms under the influence of heat.

By Tm we mean the crystalline melting point as indicated by the temperature at which the peak is found on the graph obtained by plotting $\Delta T°$ against $T°$ C. for a sample of the polymer, using a Du Pont Thermal Analyser and a heating rate of 20° C. per minute.

The produtcion of the shaped article may be achieved in any suitable manner, e.g. by melt-shaping or cold forming the composition of crystalline polymer and cross-linking agent. By melt shaping we mean the process of shaping the composition, e.g. by injection moulding, compression-moulding, blow moulding or extrusion, while the crystalline polymer is at a temperature above Tm. By cold forming, we mean the process of shaping the crystalline polymer at a temperature which is below Tm.

The invention is particularly suitable for cross-linking shaped articles made by melt shaping a composition of crystalline polymer and cross-linking agent. Where the shaped article is produced in such a manner it will be appreicated that with the use of cross-linking agents which are active at the crystalline melting point of the polymer, some cross-linking may be unavoidable while the composition is at a temperature above Tm, and the conditions of the melt shaping process should be chosen such that the resultant shaped article still contains some unreacted cross-linking agent.

The amount of cross-linking agent, e.g. free-radical generator, used will depend on the reactivity thereof and upon the extent of cross-linking required in the shaped article. In the case of a free-radical generator, 0.25 to 10 parts by weight per 100 parts by weight of crystalline polymer may be used, for example, although in general 1 to 5 parts will suffice.

The choice of cross-linking agent will depend on the nature of the crystalline polymer and on the processing conditions. For use with polyethylene, dicumyl peroxide, 2,5-dimethyl-2,5-di(t-butyl peroxy) hexyne-3 and ditertiary butyl peroxide may be mentioned in particular. For us ewith polypropylene, 1,1,4,4,7,7-hexamethyl-cyclo-4,7-diperoxynonane may be mentioned.

If it is desired that there be only a small amount of cross-linking of the polymer during melt shaping, a cross-linking agent having only a low reactivity at the temperature of melt shaping should be chosen. On the other hand, it is desirable that the cross-linking agent should have a sensible reactivity under the conditions at which cross-linking is subsequently to be effected in accordance with our invention.

Where the crystalline polymer is a polyolefin and the cross-linking agent is a free-radical generator, uncombined polymerisable non-conjugated polyene may be present in the shaped article since this aids the subsequent cross-linking step. By polymerisable non-conjugated polyene, we mean a compound which contains at least two ethylenic bonds which are activatable by free-radicals and are non-conjugated. Examples are found amongst poly-α-alkenyl esters of polycarboxylic acids, poly($\alpha,\beta$-ethylenically unsaturated esters) of polyols, α-alkenyl esters of $\alpha,\beta$-ethylenically unsaturated carboxylic acids and poly-α-alkenyl derivatives of aromatic hydrocarbons. Examples which may be used are allyl esters of maleic, fumaric, itaconic, citraconic, acrylic and methacrylic acids, diacrylates and dimethacrylates of diols, diallyl esters of sebacic and phthalic acids; polyallyl cyanurates and divinyl benzenes.

The amount of non-conjugated polyene used in the composition may be from 1 to 20 parts per 100 parts of polyolefin by weight, for example, although from 2 to 6 parts by weight are preferred.

The extent by which the Tm of the polymer may be raised by the application of pressure depends up on the raised by the application of pressure applied; the effect obtained with some polymers is greater than that obtained with others. The Tm of high density polyethylene, for example, may be raised by approximately 25° C. for every 1000 atmospheres increase in pressure while that of polypropylene may be raised by approximately 16° C. by a similar increase in pressure.

Pressures of up to 3000 atmospheres are readily attainable in relatively inexpensive equipment and in general these may prove adequate in most cases. Pressures in excess of 3000 atmospheres may require more expensive equipment but pressures up to 5000 atmospheres or even higher may be used if desired. In the cross-linking of crystalline polyethylene pressures in the range 1000 to 3000 atmospheres will generally be found adequate.

The pressure at which the cross-linking reaction is effected may conveniently be applied in an autoclave; the use of an autoclave of generally cylindrical shape is particularly convenient if the shaped article to be fabricated is in the form of a rod, pipe or tube. The pressure may be applied to the article in the autoclave by means of a ram or piston, the pressure being transmitted, for example, by a hydraulic medium e.g. oil or gas, or any suitable medium which does not react with the polymer under the operating conditions. Where a gas is to be used, care should be exercised to choose one which is insoluble in the polymer, and in which he polymer is insoluble, under the conditions of temperature and pressure used in the process.

Surprisingly, we have found water to be a particularly suitable hydraulic medium for the purposes of the invention, especially for use with crystalline polyolefins. In particular, it does not contaminate the samples, is cheap and safe, and is easy to handle. It may be desirable for the water to contain a corrosion inhibitor.

The cross-linking of the shaped polymeric article is effected at a temperature below Tm of the polymer at the elevated pressure. However, at temperatures slightly below Tm a significant proportion of the normally crystalline phase of some crystalline polymers may have changed to an amorphous phase as observable from an examination of the graph obtained by plotting $\Delta T°$ against T° C. for a sample of the polymer using a Du Pont Thermal Analyser. If desired, the cross-linking may be effected at a temperature at which none of the normally crystalline phase of the polymer has changed to an amorphous phase. For example, for crystalline polyethylene the temperature at which destruction of the crystallites commences is about 30° C. below the actual Tm at the elevated pressure. Thus, for a crystalline polyethylene having a Tm at normal pressure of 130° C., if it is desired to effect the cross-linking at say 150° C., the shaped article may be subjected to a pressure of about 2000 atmospheres whereby Tm of the polymer will be raised to about 180° C. Similarly, if it is desired to effect the cross-linking of crystalline polyethylene at a temperature of 175° C. the shaped article may be subjected to a pressure of about 3000 atmospheres whereby Tm of the polymer will be raised to about 205° C.

We have also found that the impact strength of the products may be increased significantly if some of the cross-linking is allowed to take place in the normally crystalline regions of the polymer, although this may lead to some reduction in the crystalline melting point and heat distortion temperature.

This may be achieved, for example, by arranging for some cross-linking to occur while the polymer is at a temperature at which at least some of the crystalline regions have melted, i.e. changed to an amorphous phase. For example, it may be arranged for some cross-linking to occur during shaping or forming. Alternatively or additionally, the cross-linking of the shaped article at high pressure may be effected at a temperature at which at least some of the crystalline regions have melted.

An indication of the amount of such melting that has occurred at any temperature may be gained from examination of the graph obtained by plotting $\Delta T°$ against T° C. for a sample of the polymer using a Du Pont Thermal Analyser.

Care must be taken that the introduction of a controlled amount of cross-linking during the shaping or forming process does not interfere unduly with the processing characteristics of the polymeric material and is not pursued to such an extent as to detract unduly from the advantages achieved by subsequent cross-linking under high pressure in accordance with our invention.

The following examples illustrate the case where cross-linking is achieved by use of a free-radical generator but it will be understood that the process of the invention is equally applicable to any process involving the thermally activated cross-linking of a crystalline polymer.

A variety of cross-linked articles may be produced by our process, including sheets, films, fibers, pipe and pipe fittings.

This invention is now illustrated by the following examples in which all parts are expressed as parts by weight.

EXAMPLE 1

(A) 100 parts of a high density polyethylene having a density of 0.955 g./cc. and a Tm of 132° C. were tumble blended with 1.5 parts of dicumyl peroxide at 95° C. for one hour in a sealed container. A sample of the composition was then compression moulded at 135° C. for five minutes using a platen pressure of one ton to form a 152.5 x 152.5 x 1.6 mm. plaque, and then allowed to cool. A 12.7 mm. wide strip was cut from the plaque and placed in a cylindrical autoclave 152.5 mm. long by 25.4 mm. diameter and the autoclave was sealed and pressurized to 3000 atmospheres with nitrogen containing less than 10 p.p.m. oxygen. The autoclave was heated to 165° C., the pressure of 3000 atmospheres maintained and the temperature held for one hour. The autoclave was then allowed to cool to 50° C., the pressure released and the sample removed from the autoclave. The sharp edges of the sample remained and there was no visual evidence of melting having taken place. The Tm of the treated polymer was 131° C., indicating that the crystalline areas of the polymer had remained substantially undamaged. The density of the sample was substantially unchanged indicating substantially unchanged crystallinity. The sample was found to contain 31% by weight of insoluble gel by refluxing a weighed sample of approximately 2 g. weight in 250 ml. of p-xylene for 17 hours, removing the sample from the xylene and drying to constant weight in a vacuum oven at 60° C. The percentage of insoluble gel is given by the expression (weight of dry sample after extraction by xylene) / (weight of original sample) × 100%

(B) A sample shaped from the same polymer but without dicumyl peroxide was subjected to the same treatment of temperature and pressure. On extraction from the autoclave the sample was found to be wholly soluble in xylene and to have a Tm of 132° C., indicating a retention of crystallite size.

(C) By way of comparison a further 12.7 mm. wide strip of the plaque prepared in Example 1A was placed on an aluminum sheet and heated to 165° C. for one hour in an oven under atmospheric pressure in order to effect cross linking. The sample showed signs of melting in that the edges of the strip of polymer had flowed. The sample was cooled and removed from the oven and shown to have a gel content of 68% by weight. Its Tm was only 120° C., indicating considerable loss of crystallinity due to interference with re-crystallisation by the cross-links formed above Tm.

EXAMPLE 2

(A) The procedure of Example 1A was repeated but using three parts of dicumyl peroxide. The sample of polymer removed from the autoclave had a Tm of 130° C. and an insoluble gel content of 58% by weight.

(B) By way of comparison the procedure of Example 1C was followed using a 12.7 mm. wide strip from the plaque prepared in Example 2A. The sample after removal from the oven showed signs of melting in that the edges had flowed over the aluminum plate. It had an insoluble gel content of 75% by weight and a Tm of only 117° C.

EXAMPLE 3

(A) 100 parts of high density polyethylene, Rigidex 85 (Rigidex is a registered trademark of B. P. Chemicals Ltd.), having a density of 0.949 g./cc. and a Tm of 121° C., were tumble blended with 1.62 parts of di-tertiary butyl peroxide for 4 hours at room temperature in a sealed container. The polymer was used in the form of a powder. A sample of the composition was then compression moulded at 145° C. for 3 minutes under a platen pressure of 2 tons followed by 5 minutes under a platen pressure of 20 tons to form a plaque having the dimensions described in Example 1A. The plaque was cooled to approximately 50° C. under the applied pressure by passing water through the platens of the press.

A 6.35 mm. wide strip was cut from the plaque and placed in a cylindrical autoclave 152.5 mm. long by 25.4 mm. diameter, the auto clave was filled with water, connected to a high pressure water supply, and the water in the autoclave pressurised to 3000 atmospheres. The autoclave was heated to 175° C., the pressure of 3000 atmospheres maintained and the temperature held for 2 hours. The autoclave was then allowed to cool to 50° C., the pressure released and the sample removed from the autoclave. The sharp edges of the sample remained and there was no visual evidence of melting having taken place. Tm of the polymer was 124° C. Density measurements indicated substantially unchanged crystallinity.

Following the procedure of Example 1A the insoluble gel content was determined by refluxing a 0.5 g. sample of polymer in 500 ml. of xylene for 22 hours. It was found to be 56%.

The heat distortion temperature was measured on a 31.65 mm. long sample cut from the strip removed from the autoclave. The procedure of B.S. 102C was followed with the exception that an air oven was used with a heating rate of 2° C. per minute. The heat distortion temperature was found to be 116° C.

(B) By way of comparison the above procedure was repeated except that the di-tertiary butyl peroxide was omitted. The sample removed from the autoclave showed no visible signs of melting, contained no gel, and showed a heat distortion temperature and Tm respectively of 116° C. and 123° C.

(C) By way of further comparison a 152.5 x 152.5 x 1.6 mm. plaque was produced following the procedure of Example 3A from a composition of 100 parts of the same high density polyethylene and 1.62 parts of ditertiary butyl peroxide. The plaque was heated in a press for 2 hours at 175° C. under a platen pressure of 20 tons to effect cross linking and then allowed to cool in the press. The product was found to have a heat distortion temperature of only 80° C. and a Tm of only 110° C.

EXAMPLE 4

(A) The procedure of Example 3A was repeated using compositions each containing 100 parts of high density polyethylene, Rigidex 85, and respectively 0.81, 5 and 10 parts of di-tertiary butyl peroxide. The properties of the cross linked products are given in the following table.

| | Polyethylene (parts) | di tertiary butyl peroxide (parts) | Percent insoluble gel in product | Crystalline melting point, ° C. in product |
|---|---|---|---|---|
| i | 100 | 0.81 | 48 | 123.5 |
| ii | 100 | 5 | 93 | 126 |
| iii | 100 | 10 | 95 | 127 |

(B) By way of comparison with A (iii) a 152.5 x 152.5 x 1.6 mm. plaque was produced following the procedure of Example 3A from a composition of 100 parts of high density polyethylene, Rigidex 85, and 10 parts of di-tertiary butyl peroxide. The plaque was then heated in an oven at 117° C., i.e. below the crystalline melting point of the polyethylene. After 90 hours at this temperature, only 60% insoluble gel content had been attained.

EXAMPLE 5

(A) A 152.5 x 152.5 x 0.8 mm. plaque was formed of high density polyethylene, Rigidex 85, following the procedure of Example 3A, but without di tertiary butyl peroxide.

Creep properties were measured on shaped specimens having dimensions 0.8 x 10.2 x 152.5 mm. cut from the plaque. In order to measure the creep properties, four small holes drilled centrally in a line along the 10.2 x 152.5 mm. face of each specimen, the two inner holes being spaced exactly 100 mm. apart. Through each of the outer holes was passed a steel pin and on each end of each pin was slid a ball race which was then clamped firmly to the face of the specimen. The specimen was suspended vertically by means of hooks placed round one pair of ball races and weights were suspended from the ball races mounted on the pin at the other end of the specimen to give a stress of 8 kg.cm.$^2$.

The sample was placed in an oven at 95° C. and the strain in the specimen measured using an optical lever extensometer, described in British Plastics, July 1964, page 386, the levers resting on two pins passed through the remaining holes of the specimen. After heating for 550 hours in the oven the specimen had stretched a total of 1.2%. The initial strain was 0.62%.

(B) By way of comparison a 152.5 x 152.5 x 0.8 mm. plaque was formed of a composition of 100 parts of high density polyethylene, Rigidex 85, and 3 parts of di-tertiary butyl peroxide and 12.7 mm. wide strips were heated under pressure following the procedure of Example 3A.

The increase in strain of the cross linked specimen with time was measured as described above. After heating for 550 hours in the oven the specimen had stretched a total of 0.87%. The initial strain was 0.41%.

(C) By way of further comparison a 152.5 x 152.5 x 0.8 mm. plaque was produced from the composition as used in Experiment B above and the plaque was heated in a press at 175° C. for 2 hours under a platen pressure of 20 tons to effect cross linking. The plaque was allowed to cool in the press.

The increase in strain of the cross linked specimen with time was measured as described above. After heating for 550 hours in the oven the specimen had stretched a total of 3.4% indicating a markedly poorer creep resistance than the sample of Experiment B. The initial strain was 2.2% indicating a lower value for modulus than that of the sample of Experiment B.

EXAMPLE 6

(A) A 152.5 x 152.5 x 3.2 mm. plaque was formed of a composition of 100 parts of high density polyethylene, Rigidex 85, and 1.62 parts of di-tertiary butyl peroxide following the procedure of Example 3A. Strips of dimensions 50.8 x 6.4 x 3.2 mm. were cut from the plaque and cross linked under pressure in autoclave following the procedure of Eample 3A. The effect of varying the pressure and the temperature in the autoclave is shown in the following table.

| Pressure in autoclave atmospheres | Temperature in autoclave, °C. | Time in autoclave, hours | Crystalline melting point, °C. in product | Percent insoluble gel in product |
|---|---|---|---|---|
| 2,000 | 165 | 5 | 125 | 70 |
| 1,500 | 150 | 5 | 127 | 45 |

(B) The above procedure was repeated except that the composition contained 3 parts of di-tertiary butyl peroxide.

| Pressure in autoclave atmospheres | Temperature in autoclave, °C. | Time in autoclave, hours | Crystalline melting point, °C. in product | Percent insoluble gel in product |
|---|---|---|---|---|
| 2,000 | 165 | 5 | 126 | 84 |
| 1,500 | 150 | 5 | 127 | 46 |

EXAMPLE 7

100 parts of polypropylene powder having a Tm of 168° C. and 3 parts of 1,1,4,4,7,7-hexamethyl-cyclo-4,7-diperoxynonane dissolved in 33 parts of toluene were slurried together. The toluene was then removed in a vacuum oven and a 152.5 x 152.5 x 3.2 mm. plaque was formed by compression moulding a sample of the composition at 165° C. for 3 minutes under a platen pressure of 2 tons and for a further 5 minutes under a platen pressure of 20 tons. The plaque was allowed to cool in the press. A 12.7 mm. wide strip of the plaque was placed in an autoclave and heated at 210° C. for 2 hours under a pressure of 3000 atmospheres following the procedure of Example 3A. The strip removed from the autoclave showed no visible signs of melting and had a Tm of 171° C. Refluxing in xylene showed that cross linking had occurred.

EXAMPLE 8

(A) A 152.5 x 152.5 x 1.6 mm. plaque of a composition of 100 parts of high density polyethylene, Rigidex 85, and 3 parts of di-teriary butyl peroxide was formed following the procedure of Example 3A. The plaque was cut into 6.4 mm. wide strips.

One strip was cross linked by heating in an autoclave at a temperature of 175° C. and at a pressure of 3000 atmospheres for 2 hours following the procedure of Example 3A. The cross linked specimen removed from the autoclave had a heat distortion temperature of 127° C., a Tm of 124° C. and 87% insoluble gel.

(B) By way of comparison a 38.1 x 6.4 x 1.6 mm. strip cut from a 152.5 x 152.5 x 1.6 mm. plaque which contained no di-tertiary butyl peroxide was placed in a glass tube, evacuated, sealed and irradiated by a $Co^{60}$ source at a dose rate of 0.445 M rads per hour. In order to produce a cross linked sample having 87% of insoluble gel it was found to be necessary to irradiate the sample in the glass tube for a total of 103 hours, i.e. to give the sample a total dose of 45.9 M rads. The heat distortion temperature of the irradiated sample was 118° C.

EXAMPLE 9

90 parts of high density polyethylene, Rigidex 85, 10 parts of low density polyethylene having a density of 0.918 g./cc. and a melt flow index of 2, and 1.5 parts of dicumyl peroxide were tumble blended for 3 hours at room temperature. The high density polyethylene was in the form of pellets and the low density polyethylene in the form of powder.

The composition was extruded in a 1.25 inch Iddon extruder through a pipe die and a sizing sleeve against which the extruded pipe was expanded by an air pressure of approximately 12 lb./sq.in. The pipe was extruded at a rate of 5 ft./min. and had an internal diameter of ⅜ inch and an external diameter of ½ inch. The temperature profile along the barrel of the extruder varied from 100° C. at the feed pocket to 133° C. at the die. The residence time in the extruder did not exceed 3 minutes.

A foot length of the extruded pipe was placed in a 2 ft. 6 in. long ¾ inch diameter autoclave and heated for 1 hour at a pressure of 3000 atmospheres and a temperature of 170° C. following the procedure of Example 3A.

On removal from the autoclave, the pipe ends were examined for visual evidence of melting but none was found. Tm of the sample was 122° C. and the sample contained 47% insoluble gel.

EXAMPLE 10

10 parts of high density polyethylene, Rigidex 85, in the form of powder, and 1.62 parts of di-tertiary butyl peroxide were tumble blended in a sealed container for 3 hours at room temperature. This composition was then further tumble blended in a sealed container with 90 parts of high density polyethylene, Rigidex 85, in the form of pellets for 4 hours at room temperature.

The composition was extruded in a 2½ inch Bone extruder through a pipe die into a vacuum pipe forming box of the "Floataire" type. The pipe was extruded at a rate of 5550 feet/hour and had an internal diameter of 11/16 inch and an external diameter of 13/16 inch. The temperature along the barrel of the extruder varied from 105° C. at the feed pocket to 142° C. at the die. The residence time in the extruder did not exceed 3 minutes.

A 10 ft. length of the extruded pipe was placed centrally in a 15 ft. long, 1 inch diameter vertical autoclave and heated for 2 hours at a pressure of 3000 atmospheres and a temperature of 180° C.

On removal from the autoclave, the pipe ends were examined for visual evidence of melting but none was found. Tm of the sample was 122° C. and the sample contained 62% insoluble gel.

EXAMPLE 11

(A) 100 parts of high density polyethylene, Rigidex 85, were ball-milled in powder form with 1.62 parts of di-tertiary butyl peroxide at room temperature for 4 hours in a sealed container.

The composition was injection moulded in a Stübbe 2 oz. injection moulder having a barrel temperature of 130° C. to 135° C. into a mould of dimensions 2 x ¼ x ⅛ inch at a temperature of 60° C. The residence time in the barrel was approximately 5 minutes and the moulding cycle varied from 30 to 45 seconds.

The injection moulded sample was heated in an autoclave for 2 hours at a temperature of 175° C. and a pressure of 3000 atmospheres following the procedure of Example 3A. The sample removed from the autoclave showed no visible signs of melting, had a Tm of 121° C. and an insoluble gel of 68%.

(B) The above procedure was repeated except that 3 parts of di-tertiary butyl peroxide were used. The sample removed from the autoclave had a Tm of 122° C. and an insoluble gel of 89%.

What we claim is:

1. In a process for the preparation of a shaped product of cross linked polymeric material by heating a shaped article of a crystalline polymer containing a thermally activatable cross linking agent, the improvement which comprises subjecting said shaped article of crystalline polymer containing thermally activatable cross linking agent to a pressure sufficient to cause a rise of at least 10° C. in the crystalline melting point (Tm) of said polymer and heating said shaped article while subjected to said pressure to a temperature which is below the crystalline melting point of said polymer at said pressure and at which cross linking will occur.

2. A process as claimed in claim 1 in which the crystalline polymer is a crystalline polyolefin.

3. A process as claimed in claim 2 in which the thermally activatable cross linking agent is a free radical generator.

4. A process as claimed in claim 2 in which the shaped article also contains uncombined polymerisable non conjugated polyene.

5. A process as claimed in claim 1 wherein the shaped article of crystalline polymer containing a thermally activatable cross linking agent is itself prepared by melt shaping a mixture of crystalline polymer and thermally activatable cross linking agent so as to leave at least some of the cross-linking agent still unreacted.

6. A process as claimed in claim 5 in which the shaped article is produced by injection moulding.

7. A process as claimed in claim 5 in which the shaped article is produced by compression moulding.

8. A process as claimed in claim 5 in which the shaped article is produced by blow moulding.

9. A process as claimed in claim 5 in which the shaped article is produced by extrusion.

10. A process as claimed in claim 1 in which some of the cross linking is effected in the normally crystalline regions of the polymer to increase the impact strength of the shaped article.

11. A process as claimed in claim 1 in which the pressure is applied to the shaped article in an autoclave and is transmitted by means of a hydraulic medium.

12. A process as claimed in claim 11 in which the hydraulic medium is water.

References Cited

UNITED STATES PATENTS

| | | | |
|---|---|---|---|
| 3,247,259 | 4/1966 | Bafford | 260—94.9GO |
| 3,260,694 | 7/1966 | Wang | 260—94.9GO |
| 3,344,126 | 9/1967 | Witman | 260—94.9GO |

FOREIGN PATENTS

| | | | |
|---|---|---|---|
| 687,414 | 1964 | Canada | 260—94.9GO |

ROBERT F. WHITE, Primary Examiner

G. AUVILLE, Assistant Examiner

U.S. Cl. X.R.

260—94.9; 264—236, 328, 331, 347